(12) United States Patent
Yin et al.

(10) Patent No.: US 8,908,849 B2
(45) Date of Patent: Dec. 9, 2014

(54) METHOD AND SYSTEM FOR OVERRIDING CALL BLOCKING

(75) Inventors: Yu Yin, Basking Ridge, NJ (US); Jay Hsu, Green Brook, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1249 days.

(21) Appl. No.: 12/323,997

(22) Filed: Nov. 26, 2008

(65) Prior Publication Data

US 2010/0128864 A1 May 27, 2010

(51) Int. Cl.
*H04M 3/42* (2006.01)
*H04M 3/436* (2006.01)

(52) U.S. Cl.
CPC ...... *H04M 3/436* (2013.01); *H04M 2203/2005* (2013.01)
USPC .................................................... 379/210.02

(58) Field of Classification Search
USPC ............ 379/210.02, 208.01, 207.11, 207.13, 379/221.11
See application file for complete search history.

(56) References Cited

U.S. PATENT DOCUMENTS

| | | | |
|---|---|---|---|
| 7,035,391 B2 * | 4/2006 | Cai et al. ................... | 379/221.11 |
| 7,139,382 B1 * | 11/2006 | Smith ....................... | 379/210.02 |
| 2004/0247106 A1 * | 12/2004 | Mullis et al. .............. | 379/211.02 |
| 2005/0201362 A1 * | 9/2005 | Klein et al. ................ | 370/352 |
| 2006/0160523 A1 * | 7/2006 | Erskine et al. .............. | 455/405 |
| 2007/0206747 A1 * | 9/2007 | Gruchala et al. .......... | 379/142.01 |
| 2010/0091969 A1 * | 4/2010 | Joy et al. ................... | 379/207.03 |

* cited by examiner

*Primary Examiner* — Sonia Gay (57) ABSTRACT

An approach is provided for overriding a call blocking feature. A request to establish a voice call over a wireless network to a called party is intercepted. A call blocking feature is detected as being enabled for the called party. The calling party is prompted for a passcode in response to the detected call blocking feature. The passcode is received from the calling party to override the call blocking feature.

14 Claims, 6 Drawing Sheets

METHOD AND SYSTEM FOR OVERRIDING CALL BLOCKING

BACKGROUND INFORMATION

The emergence of sophisticated telecommunication features and services has enabled users to control their experience with respect to how and when voice calls are processed and received. One such popular feature is that of call blocking (i.e., "Do Not Disturb," "Call Screening," etc.), which permits the user to effectively filter out unwanted calls. Typical situations in which call blocking is desirable involve solicitations from unknown businesses or organizations, or simply unwanted parties. However, under certain circumstances, the call blocking feature can result in a desired call being blocked. For instance, an emergency call to the user can be fitted, when in fact such a call is important to the user (at times unbeknownst to the user). Unfortunately, traditional telephony networks do not provide a more robust, flexible call blocking capability.

Therefore, there is a need for an approach that selectively bypasses call blocking to permit certain calls to reach the target user.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for bypassing a call blocking feature are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to an intelligent network architecture, it is contemplated that these embodiments have applicability to any communication system capable of signaling and processing telephony based communication sessions.

Figure 1:
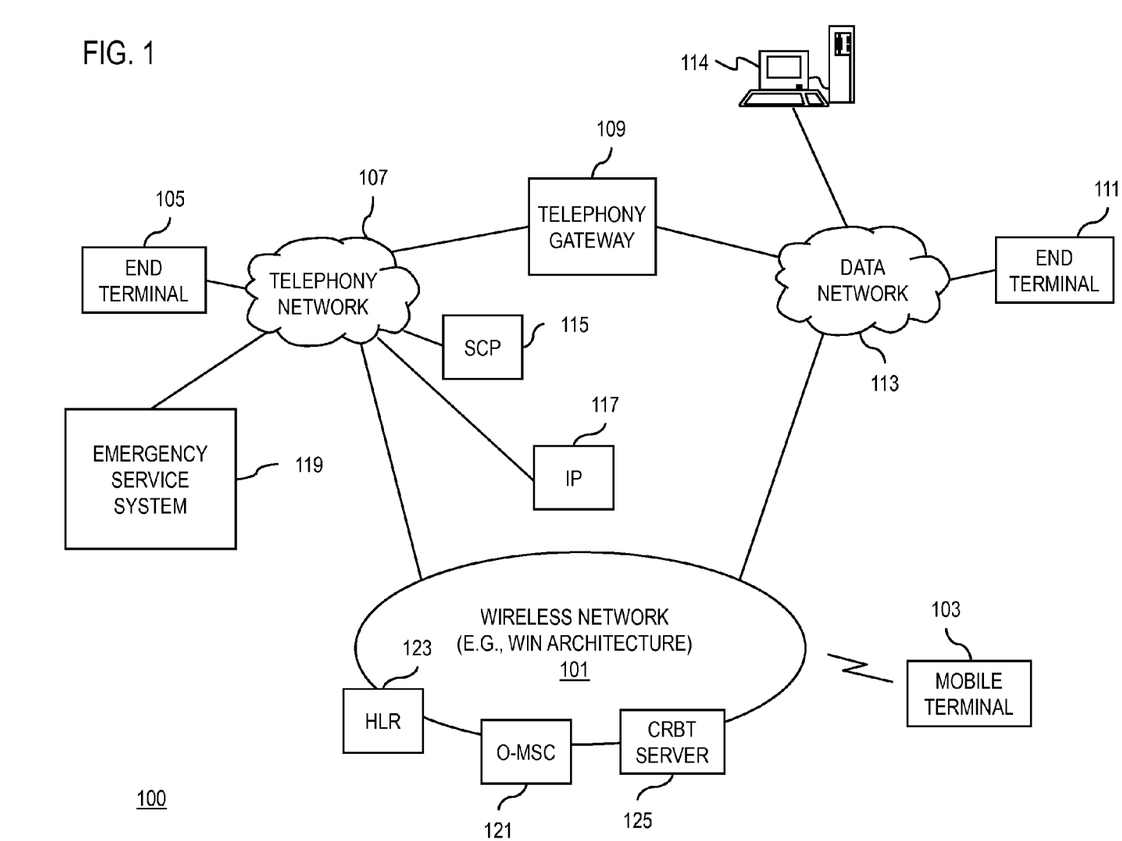
FIG. 1 is a diagram of a system capable of overriding a call blocking feature, according to an exemplary embodiment.

FIG. 1 is a diagram of a system capable of overriding a call blocking feature, according to an exemplary embodiment. For the purposes of illustration, a mechanism for bypassing a call blocking feature is described with respect to a communication system 100 that includes a wireless network 101 supporting one or more mobile devices 103. The system 100 also supports transmission of a telephony based communication session to and from an end terminal 105 connected to a telephony network 107 via telephony gateway 109, and an end terminal 111 connected via a data network 113. In this embodiment, the end terminal 105 can be any telephony device capable of communicating over the telephony network 107, and end terminal 111 can be any computing device (e.g., desktop computer, laptop computer, or Personal Digital Assistant (PDA)) capable of communicating over the data network 113. The data network 113 permits a host 114 to initiate and receive telephony-based communication sessions (e.g., voice calls) via a graphical user interface (GUI) such as a browser application or any web-based application for mobile devices 103a and 103b and end terminals 105 and 111.

The wireless network 101 is a wireless access and transport network, such as a cellular (2G, 3G, 4G, or above), IEEE (Institute of Electrical and Electronics Engineers) 802.11, 802.15, 802.16, or satellite network; and may employ various mobile communication technologies including, for example, in cellular networks, global system for mobile communications/universal mobile telecommunication system (GSM/UMTS) technologies (i.e., 3GPP technologies) and code division multiple access (cdmaOne/CDMA2000) technologies (i.e., 3GPP2 technologies). The telephony network 107 can be a Public Switched Telephone Network (PSTN), a Public Land Mobile Network (PLMN), or similar. Moreover, the data network 113 can be any local area network (LAN), metropolitan area network (MAN), wide area network (WAN), the Internet, or any other suitable packet-switched network, such as a commercially owned, proprietary packet-switched network, e.g., a proprietary cable or fiber-optic network.

According to one embodiment, the wireless network 101 operates in conjunction with the telephony network 107 to support a call blocking feature, as well as overriding such feature. The wireless network 101, in an exemplary embodiment, employs a wireless intelligent network (WIN) architecture. The WIN protocols provide a framework for integrating intelligent network services and wireless services, and are fully more detailed in standards of Telecommunications Industry Association (TIA), including American National Standards Institute (ANSI)-41 (which is incorporated herein by reference in its entirety). Additionally, the telephony network 107 utilizes an architecture known to as an Advanced Intelligent Network (AIN). As such, the telephony network 107 can be referred to as an intelligent telephony network, and the wireless network 101 a wireless intelligent network. This intelligent architecture provides separation between service logic and switching equipment, whereby services can be developed independently from the underlying switching functionality. The telephony network 107 can detect one of a number of call processing events identified as AIN "triggers." AIN employs three basic call processing elements: Service Control Point (SCP), Service Switching Point (SSP), and Signal Transfer Point (STP)—of which, only SCP 115 is shown in FIG. 1. The network 107 additionally includes an Intelligent Peripheral (IP) 117, which provides certain specialized resource functions, e.g., digit collection, announcement playback, etc. This architecture is further described below with respect to FIG. 3.

By way of example, an emergency service system 119 provides a "911" or other emergency service in which emergency calls are processed. In one scenario, an emergency service operator may need to call back a user who initially called the system 119. However, the user may be a subscriber of a call block feature (e.g., "Do Not Disturb", "Call Screening", etc.); as such, the emergency service operator will not be able to get through to the user. In other words, with the call block feature invoked, the critical callback will be missed.

In this example, the wireless network 101 includes an Origination Mobile Switching Center (O-MSC) 121, a corresponding Home Location Register (HLR) 123, and a Color Ring Back Tone (CRBT) server 125. The O-MSC 121 interfaces with the telephony network 107, and acts as a service switching point to provide call origination/termination triggers. The O-MSC 121 also supplies queries to service logic for instructions. The HLR 123 provides mobility management functions (as well as service control and data functions) for terminals within the home coverage area of the wireless network 101. A Color Ring Back Tone (CRBT) feature, as supported by the server 125, allows a called party to play a message or ringtone (e.g., voice and music ring back tones) for the calling party to hear while the communication device system is connecting the party's devices for communication. For instance, the called party can play a message such as "Thank you for calling, please leave a message."

To address this problem, the system 100 provides an override capability through the use of the intelligent architecture, according to certain embodiments. This operation is next explained.

Figure 2A:
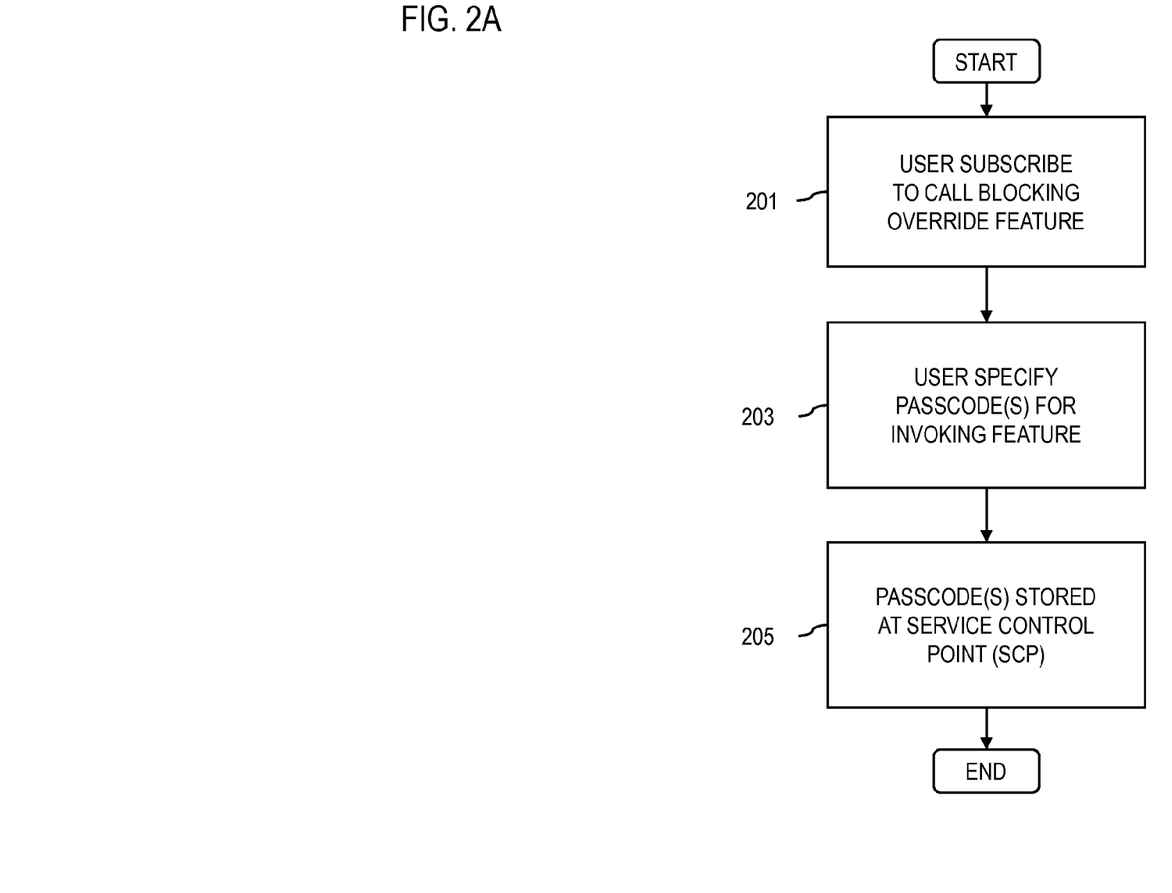
FIGS. 2A and 2B are flowcharts of processes for bypassing a call blocking feature, according to various exemplary embodiments.

FIGS. 2A and 2B are flowcharts of processes for bypassing a call blocking feature, according to various exemplary embodiments. As seen in FIG. 2A, a user of the wireless network 101 subscribes, as in step 201, to a call blocking override (or bypass) feature, which can be supplied by a service provider of system 100. During the provisioning process, for example, the user can specify the passcode(s) associated with invocation of this feature (step 203). That is, a particular passcode can be assigned to permit, for example, emergency calls to bypass the call blocking feature. Also, another different passcode can be associated with overriding emergency calls as well as non-emergency calls. In an exemplary embodiment, the passcode is a personal identification number (PIN). In step 205, the passcodes are stored at the SCP 115.

Figure 2B:
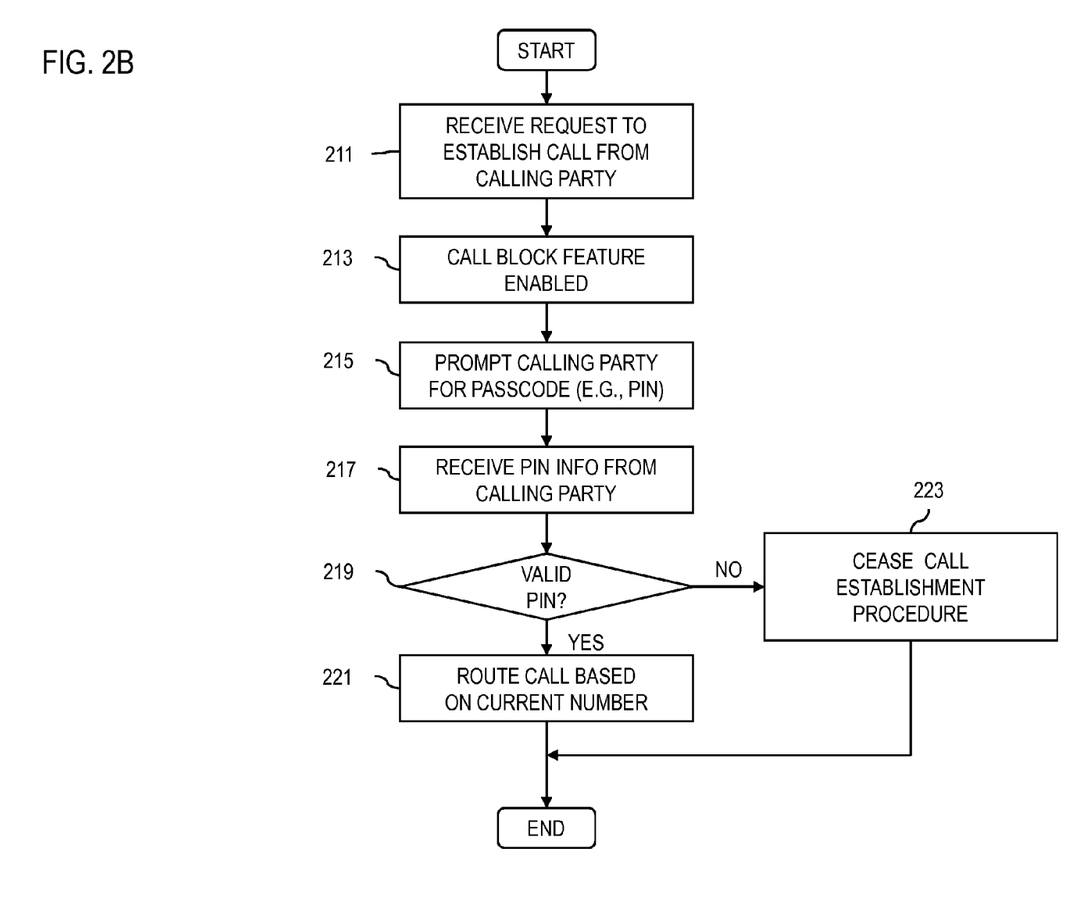

Turning now to FIG. 2B, the override operations is as follows. For the purposes of explanation, it is assumed that a calling party uses the mobile terminal 103 to place a voice call to a called party of end terminal 105. In step 211, the telephony network 107 receives a request to establish a call from the calling party. The called party, in this scenario, is a subscriber of a call block feature. Consequently, the process determines, via the intelligent functionalities of the wireless network 101, that the call block feature is enabled (step 213). At this juncture, the call cannot be completed.

In step 215, the calling party is prompted for a passcode (e.g., personal identification number (PIN)). The calling party can then supply the PIN in response to the prompt; this PIN is collected by the IP 117, per step 217. If the PIN is a valid one (as determined in step 219), the call block feature is bypassed, wherein the call can be routed to the called party at the end terminal 105 (step 221). Otherwise, if the PIN is not valid, the call establishment procedure is ceased, as in step 223.

To better appreciate the above process, the architecture of the wireless network 101 is now described.

Figure 3:
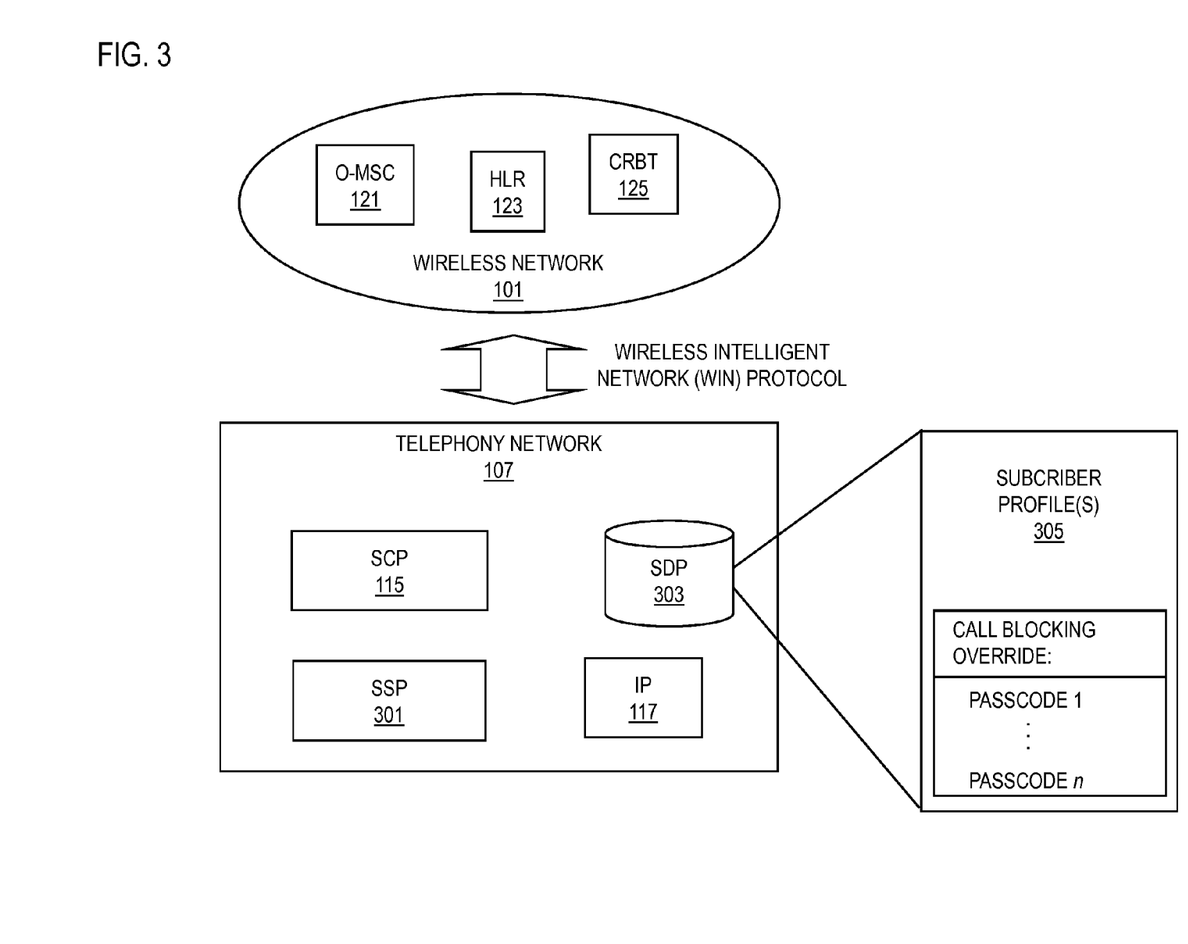
FIG. 3 is a diagram of an intelligent telephony signaling network for providing an override of a call blocking feature, according to an exemplary embodiment.

FIG. 3 is a diagram of an intelligent telephony signaling network for providing an override of a call blocking feature, according to an exemplary embodiment. In this diagram, the telephony network 107 is shown to include a Service Switching Point (SSP) 301. The SSP 301 includes one or more appropriately equipped programmable switches, which recognize AIN type calls. The AIN also employs a Service Data Point (SDP) 303 to store a subscriber profile 305, which can specifies the various passcodes (passcode 1 . . . passcode n) that permit overriding of the call block feature. In one embodiment, the passcodes are Personal Identification Numbers (PINs).

Under the arrangement of FIG. 3, the Intelligent Peripheral (IP) 117 collects digits from a calling party (e.g., subscriber of wireless network 101). For instance, the IP 117 plays an announcement to an agent (or operator), prompting the agent to enter a PIN or passcode. The SCP 115 compares the collected digits with the mobile subscriber's PIN information in the SDP database 303 and sends the call to the corresponding routing number.

The SSP 301 is a switch that is capable of processing a special call (e.g., toll-free, 800, etc.) and routing such calls to the SCP 115. The SSP 115 utilizes the SDP database 303, which contains pre-specified subscriber instructions that are needed to route an incoming call. In an exemplary embodiment, the SDP database 303 includes the subscriber profile 305, which may be implemented as a look-up table. The subscriber profiles 305, for example, may be stored on the SDP 303, which may be implemented as an optical disc, magnetic tape, or dynamic random access memory (DRAM), or other storage media. The SSP 301 communicates with the SCP 115 to make requests for specific instructions for call treatment, according to the stored profiles 305 within the SDP 303. The subscriber profile 305 may further instruct call treatment where there is a mobile subscriber, based on prepaid subscription and, e.g., Ring Back Tone (RBT) feature.

It is contemplated that any one of the components of the networks 101 and 107 can be merged to provide various combinations of functionalities. For example, the SCP 115 and the SSP 301 can be combined, and referred to as a Switching Service and Control Point (SSCP). In general, the SSCP provides technical requirements for completion of an incoming call and determines the appropriate mode of communication and network structure needed to complete the incoming call. The SSCP provides an endpoint under a Signaling System 7 (SS7) protocol, serving as a host based network entity that manages the network configuration. Among other functions, the SSCP also coordinates network operator and problem determination requests, maintains network address and mapping tables, and provides directory support and session services. As the service logic, the SCP 115 provides translation and routing functions.

It is also contemplated that the above service logic can reside within the wireless network 101.

The above arrangement provides the capability to bypass blocked calls, as now explained.

Figure 4:
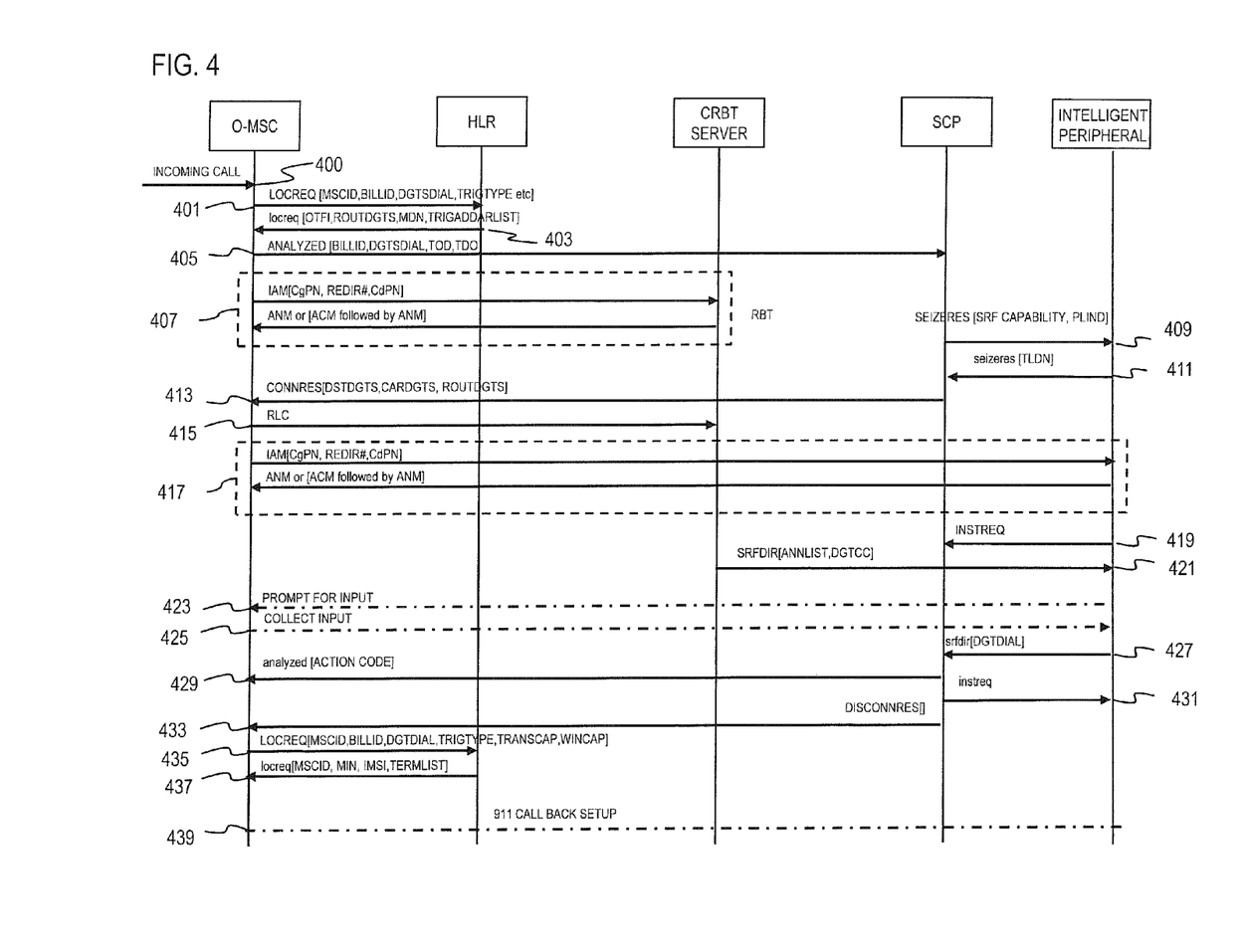
FIG. 4 is a ladder diagram of a process utilized by the system of FIG. 3 for bypassing the call blocking feature, according to an exemplary embodiment.

FIG. 4 is a ladder diagram of a process utilized by the system of FIG. 3 for bypassing the call blocking feature, according to an exemplary embodiment. The process begins at step 400 where the Origination Mobile Switching Center (O-MSC) 121 receives an incoming call (e.g., 911 callback) to a mobile subscriber (e.g., mobile terminal 103). In step 401, the O-MSC 121 detects the mobile termination trigger and sends a Location Request (LOCREQ) to the HLR 123 associated with the mobile subscriber operating mobile terminal 103. The HLR 123, as part of the wireless network 101, contains information about the subscribers within the provider's home service area. In certain embodiments, HLR 123 in the call processing system includes executable instructions (e.g., a software application having one or more executable instructions) to arm a trigger that transfers call processing to another application in a component of the network 107: e.g., CRBT server 125. The HLR 123 has been provisioned to set the triggers based on the characteristics of the call. Other triggers may be armed based on other services subscribed by the user of the called communication device.

Thereafter, in step 403 the HLR 123 determines that this mobile subscriber is a prepaid subscriber and has also subscribed to a Ring Back Tone (RBT) feature. HLR 123 returns location request result to the O-MSC 121. The HLR 123 not only transmits the positional information, but may first determine whether the positional information has changed and transmits the updated positional information only if the positional information triggers a different subscriber site. The return result message includes a One Time Feature Indicator (OTFI) parameter to indicate that the called party has the RBT feature activated. A Routing Digits (ROUTDGTS) parameter is set to the number to be used to route to the CRBT server 125. Further, a Trigger Address List (TRIGADDRLIST) parameter is set to arm initial termination and location triggers. The CRBT server 125 can be instructed to release the call; and the calling party can be connected to the called party if the PIN is correct, thus bypassing the call blocking feature.

In step 405, the O-MSC 121 detects the initial termination trigger and sends analyzed information ("ANALYZD") to the SCP 115, including Time_of_Day and Time_Date_Offset (time offset of local civil time with respect to UTC) parameters. A message is also sent to HLR 123 to obtain the routing number. An Initial Address Message (IAM) message is transmitted to extend the call to the CRBT server 125. The IAM message comprises an Integrated Services Digital Network User Part (ISUP) message (which is the call control part of the SS7 protocol). The ISUP determines the procedures for setting up, coordinating and taking down calls on the SS7 network 107.

Next, in step 407, the O-MSC 121 sends an ISUP IAM signal to extend the call leg towards the CRBT server 125. Additionally, the CRBT server 125 determines whether it has the resources to accept the incoming call leg and plays audio information based on called party's (call interception subscriber) pre-provisioned arrangement. In step 409, the SCP 115 detects the subscriber a call blocking feature (e.g., call screening feature) to block this incoming call; however, this subscriber also has 911 call back feature, for example. Accordingly, the SCP 115 sends a SEIZERES to the Intelligent Peripheral (IP) 117 to request for resources. SEIZERES is a signal over a line or trunk between connected equipment indicating a service or access request. A seizure or series of seizures creates a signaling path between the appropriate components, allowing supervision signaling. For example, a seizure, for instance, involves a physical state change in the circuit as a device goes off-hook and the circuit transitions from an idle state to a busy state and current flows. The IP 117 allocates a Temporary Local Directory Number (TLDN) to the appropriate resource, as in step 411, and returns the information to the SCP 115 in the SEIZERES.

Thereafter, the SCP 115 sends a Connect Resource (CONNRES) message to the O-MSC 121 with the value IP TLDN for parameter destination digits (DSTDGTS) in step 413. In step 415, the O-MSC 121 responds by sending an ISUP release complete (RLC) to the CRBT server 125 to disconnect the call leg to the CRBT server 125.

Per step 417, the O-MSC 121 and the IP 117 exchange messages. Specifically, the O-MSC 121 sends ISUP IAM signal to extend the call leg to the IP 117. IP 117 then accepts the incoming call leg and sends ISUP ANM back to O-MSC 121.

In step 419, IP 117 sends an instruction request (INSTREQ) to the SCP 115, requesting call processing instruction. The CRBT 125, as in step 421, sends a SRFDIR to the IP 117. The SRFDIR includes the announcement list (ANNLIST) and digit collection (DGTCC) parameters. To collect the information from the user, the IP 117 prompts for input from the user, and collects such input information, per steps 423 and 425. For example, the ANNLIST instructs the IP 117 which announcement to play. The DGTCC message instructs the IP 117 to collect digits from the calling party. In this example, the IP 117 plays an announcement to the 911 agent and prompts the agent to enter a PIN or passcode. When the 911 agent enters a PIN, the IP 117 collects the digits.

Thereafter, the IP 117 sends SRFDIR to the SCP 115 with collected dialed digits in parameter DGTDIAL (step 427). Afterwards, the SCP 115 compares the collected digits with the mobile subscriber's PIN information in the database 303. If the digits match the database content, the SCP 115 sends a signal analyzed message back to the O-MSC 121 with action code value as "continue" (step 429).

Once the digits are collected and compared, in step 431, SCP 115 sends INSTREQ to IP to end the transaction, and allows the IP 117 to release the resource. Subsequently, in step 433, the SCP 115 sends a disconnect parameter (DISCONN) to the O-MSC 121 to instruct the O-MSC 121 to disconnect the call leg to the IP 117. The O-MSC 121 detects a location trigger and sends a LOCREQ to the HLR 123, where the HLR 123 returns LOCREQ to the O-MSC 121 with the mobile subscriber's routing information as TERMLIST (per steps 435 and 437). Finally, at step 439, the 911 agent's call is connected to the mobile subscriber over the wireless network 101.

The above process advantageously permits a user to control call processing by allowing certain calls to bypass call blocking features.

The processes described herein for bypassing a call blocking feature may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
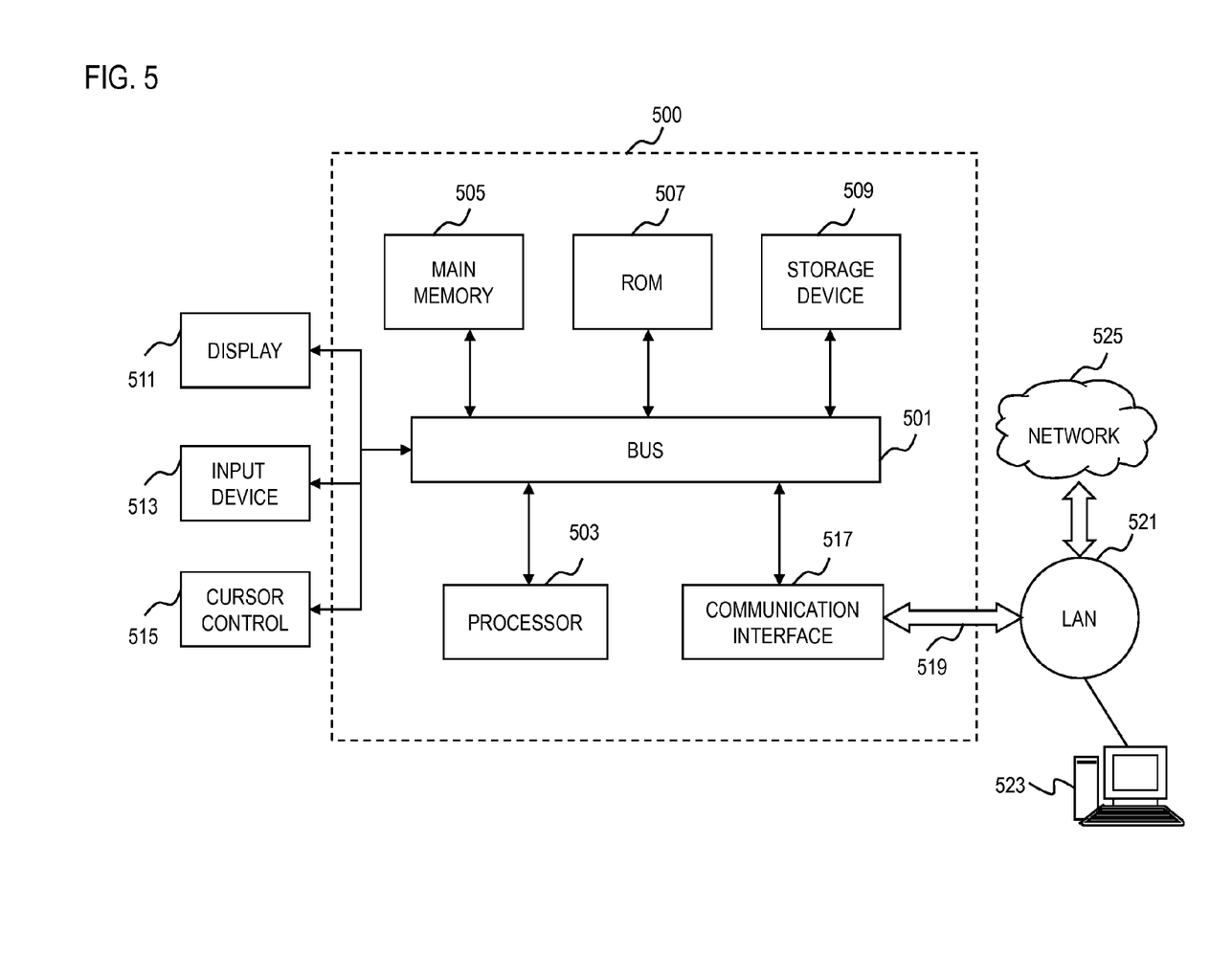
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   intercepting a request to establish a voice call from a calling party to a called party, wherein the calling party originates the voice call over an advanced intelligent telephone network and the voice call is to be received by the called party via a wireless network;
   detecting that a call blocking feature is enabled for the called party;
   prompting the calling party for a passcode in response to the detected call blocking feature, wherein the passcode is provided by the calling party to the advanced intelligent telephone network; and
   receiving the passcode from the calling party to override the call blocking feature, wherein a mobile switching center intercepts the request to establish a voice call and creates a call leg with an intelligent peripheral that is configured to prompt for the passcode, the passcode is compared to a plurality of passcodes stored in a database that is maintained by a service control point to validate the passcode, the intelligent peripheral and the service control point are included in the advanced intelligent telephone network, and the mobile switching center, in response to an instruction from the service control point, disconnects the call leg to the intelligent peripheral after the comparison, wherein prior to detecting that the call blocking feature is enabled for the called party, determining to send an Initial Address Message message to extend a call leg for the requested voice call to a Color Ring Back Tone (CRBT) server, and wherein the CRBT server is configured to determine whether resources are available to accept the call leg and plays audio information to the calling party based on a pre-provisioned arrangement of the called party when the resources are available.

2. A method according to claim 1, wherein wireless network that includes a home location register configured to determine that a calling party of the voice call is a subscriber to the wireless network.

3. A method according to claim 1, further comprising:
initiating a disconnect procedure for the voice call if the passcode is not valid.

4. A method according to claim 1, wherein the intelligent peripheral is further configured to collect digits from the calling party and to provide the collected digits to the service control point.

5. A method according to claim 1, wherein the voice call originates from an emergency services agent.

6. A method according to claim 1, wherein the voice call is initiated from a mobile terminal.

7. A method according to claim 1, wherein the passcode includes a personal identification number.

8. An apparatus comprising:
a mobile switching center configured to intercept a request to establish a voice call from a calling party to a called party, wherein the calling party originates the voice call over an advanced intelligent telephone network and the voice call is to be received by the called party via a wireless network;

a service control point configured to detect that a call blocking feature is enabled for the called party; and an intelligent peripheral that is configured to prompt the calling party for a passcode in response to the detected call blocking feature to override the call blocking feature, wherein the passcode is provided by the calling party to the advanced intelligent telephone network, the mobile switching center creates a call leg with the intelligent peripheral, the passcode is compared to a plurality of passcodes stored in a database that is maintained by the service control point to validate the passcode, the intelligent peripheral and the service control point are included in the advanced intelligent telephone network, and the mobile switching center, in response to an instruction from the service control point, disconnects the call leg to the intelligent peripheral after the comparison, wherein prior to detecting that the call blocking feature is enabled for the called party, determining to send an Initial Address Message message to extend a call leg for the requested voice call to a Color Ring Back Tone (CRBT) server, and wherein the CRBT server is configured to determine whether resources are available to accept the call leg and plays audio information to the calling party based on a pre-provisioned arrangement of the called party when the resources are available.

9. An apparatus according to claim 8, wherein the wireless network that includes a home location register configured to determine that a calling party of the voice call is a subscriber to the wireless network.

10. An apparatus according to claim 8, further comprising:
a processor configured to compare the passcode with the plurality of passcodes stored in the database, wherein
the processor is further configured to initiate a disconnect procedure for the voice call if the passcode is not valid.

11. An apparatus according to claim 8, wherein the intelligent peripheral is further configured to collect digits from the calling party, and the service control point being further configured to receive the collected digits.

12. An apparatus according to claim 8, wherein the voice call originates from an emergency services agent.

13. An apparatus according to claim 8, wherein the voice call is initiated from a mobile terminal.

14. An apparatus according to claim 8, wherein the passcode includes a personal identification number.

* * * * *